(12) United States Patent
Bharadwaj

(10) Patent No.: US 10,984,668 B2
(45) Date of Patent: Apr. 20, 2021

(54) COLLABORATIVE LEARNING PLATFORM FOR GENERATING AND PRESENTING CONTEXT-ORIENTED CONTENT ON AN ELECTRONIC DEVICE

(71) Applicant: Srinivas Bharadwaj, Los Altos, CA (US)

(72) Inventor: Srinivas Bharadwaj, Los Altos, CA (US)

( * ) Notice: Subject to any disclaimer, the term of this patent is extended or adjusted under 35 U.S.C. 154(b) by 49 days.

(21) Appl. No.: 14/283,698

(22) Filed: May 21, 2014

(65) Prior Publication Data

US 2014/0356844 A1 Dec. 4, 2014

Related U.S. Application Data

(60) Provisional application No. 61/956,042, filed on May 30, 2013.

(51) Int. Cl.
*G09B 5/08* (2006.01)
*G06F 40/58* (2020.01)
*G06F 40/169* (2020.01)
*G06F 16/958* (2019.01)

(52) U.S. Cl.
CPC ............ *G09B 5/08* (2013.01); *G06F 16/972* (2019.01); *G06F 40/169* (2020.01); *G06F 40/58* (2020.01)

(58) Field of Classification Search
CPC .... G06F 17/241; G06F 16/972; G06F 17/289; G09B 5/08
See application file for complete search history.

(56) References Cited

U.S. PATENT DOCUMENTS

| | | | | |
|---|---|---|---|---|
| 8,488,916 B2* | 7/2013 | Terman | ................... | G09B 5/08 382/315 |
| 8,510,668 B1* | 8/2013 | Raskin | .................. | G06F 3/0484 715/255 |
| 2003/0101413 A1* | 5/2003 | Klein | ................ | G06F 17/30873 715/206 |
| 2007/0101250 A1* | 5/2007 | Sumpf | ................ | G06F 17/2229 715/209 |
| 2007/0288247 A1* | 12/2007 | Mackay | ................ | G06Q 10/00 705/1.1 |
| 2009/0233705 A1* | 9/2009 | LeMay | ................... | G07F 17/32 463/25 |
| 2010/0278453 A1* | 11/2010 | King | ...................... | G06Q 10/10 382/321 |
| 2011/0066957 A1* | 3/2011 | Prats | ..................... | G06F 17/241 715/753 |
| 2011/0087956 A1* | 4/2011 | Sherman | .................. | G09B 5/00 715/233 |

(Continued)

*Primary Examiner* — Eddy Saint-Vil

(57) ABSTRACT

The embodiments herein disclose a system and method for presenting a context-oriented content from a plurality of information sources. The method includes receiving a request from an electronic device for the context-oriented content associated with an item of a particular object. Further, the method includes identifying the context-oriented content associated with the item from the plurality of information sources. Furthermore, the method includes generating an overlay framework layers including context-oriented content. Furthermore, the method includes presenting the overlay framework layers associated with the item within the particular object to the user on an electronic device.

21 Claims, 18 Drawing Sheets

(56) References Cited

U.S. PATENT DOCUMENTS

| | | | | |
|---|---|---|---|---|
| 2011/0261030 | A1* | 10/2011 | Bullock | G06F 15/0283 |
| | | | | 345/204 |
| 2012/0066581 | A1* | 3/2012 | Spalink | G06F 40/169 |
| | | | | 715/232 |
| 2012/0200573 | A1* | 8/2012 | Stoner | G09B 5/02 |
| | | | | 345/472 |
| 2013/0002708 | A1* | 1/2013 | Raffle | G09G 5/14 |
| | | | | 345/619 |
| 2013/0139209 | A1* | 5/2013 | Urrabazo | H04N 21/4828 |
| | | | | 725/109 |
| 2013/0198642 | A1* | 8/2013 | Carney | G06F 3/0484 |
| | | | | 715/738 |
| 2013/0232149 | A1* | 9/2013 | Smith | G06F 16/972 |
| | | | | 707/740 |
| 2014/0006924 | A1* | 1/2014 | Tsolis | G06Q 30/0277 |
| | | | | 715/234 |
| 2014/0067934 | A1* | 3/2014 | Ware | G06Q 50/01 |
| | | | | 709/204 |
| 2014/0337730 | A1* | 11/2014 | King | G06F 16/44 |
| | | | | 715/716 |
| 2015/0187225 | A1* | 7/2015 | Worsley | G09B 7/07 |
| | | | | 434/178 |

* cited by examiner

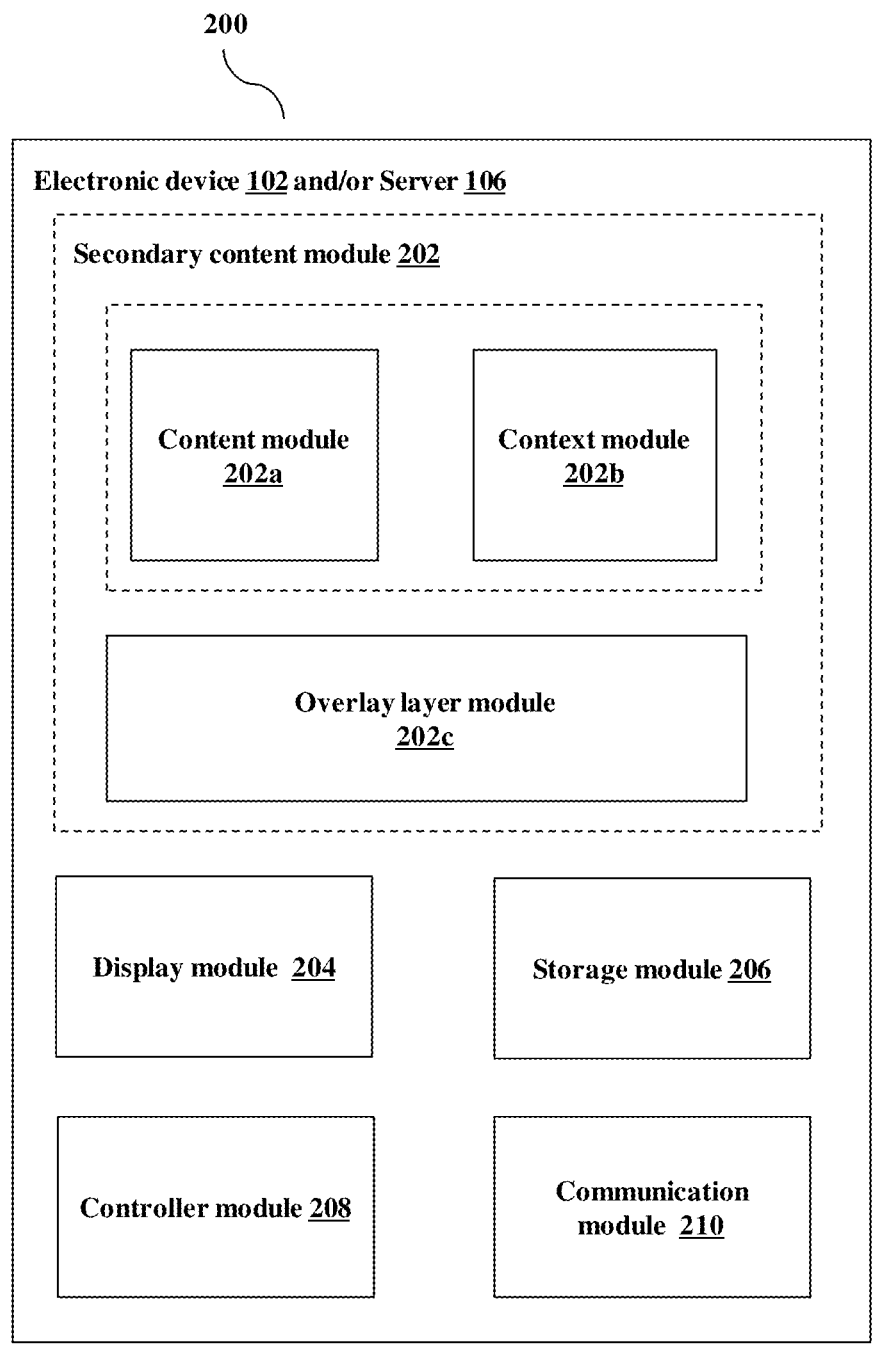

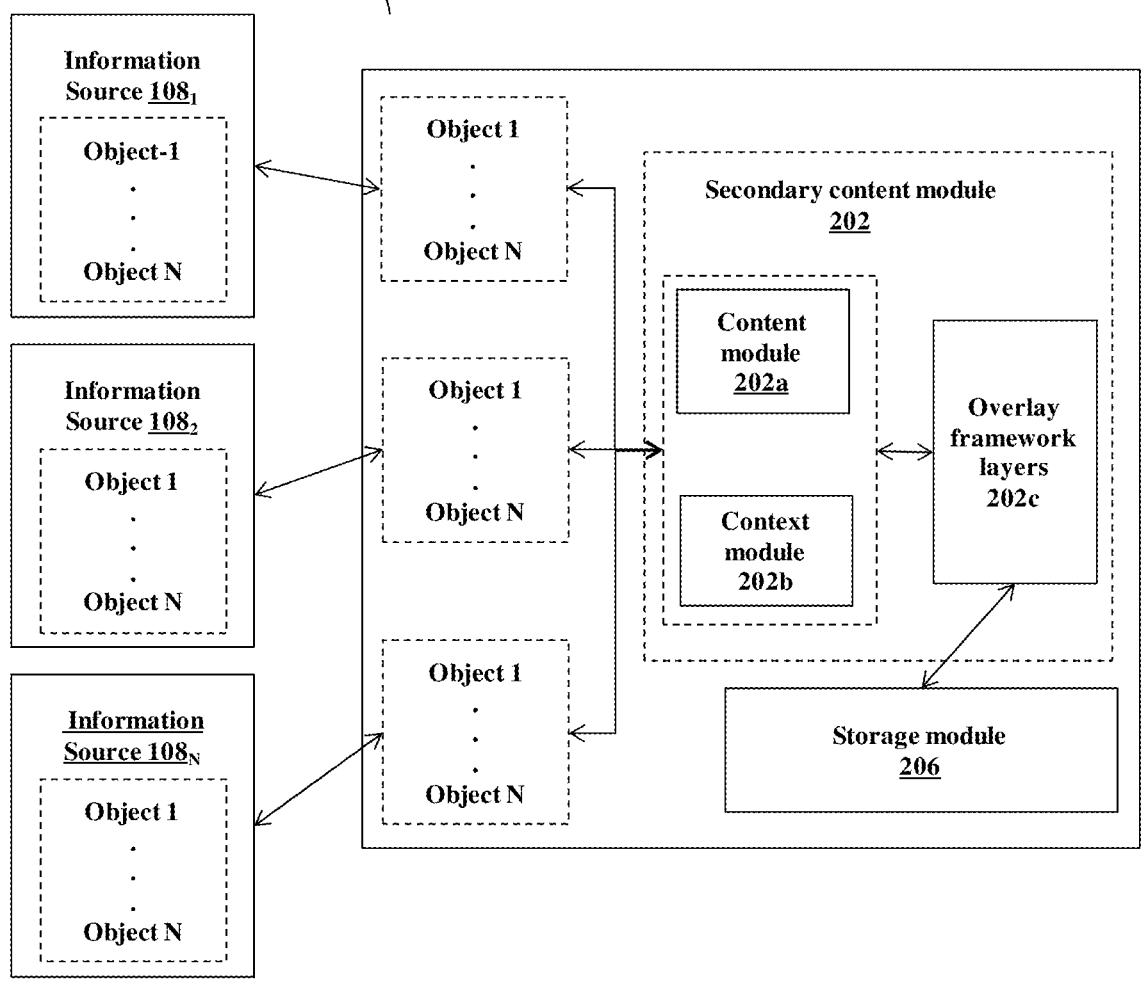

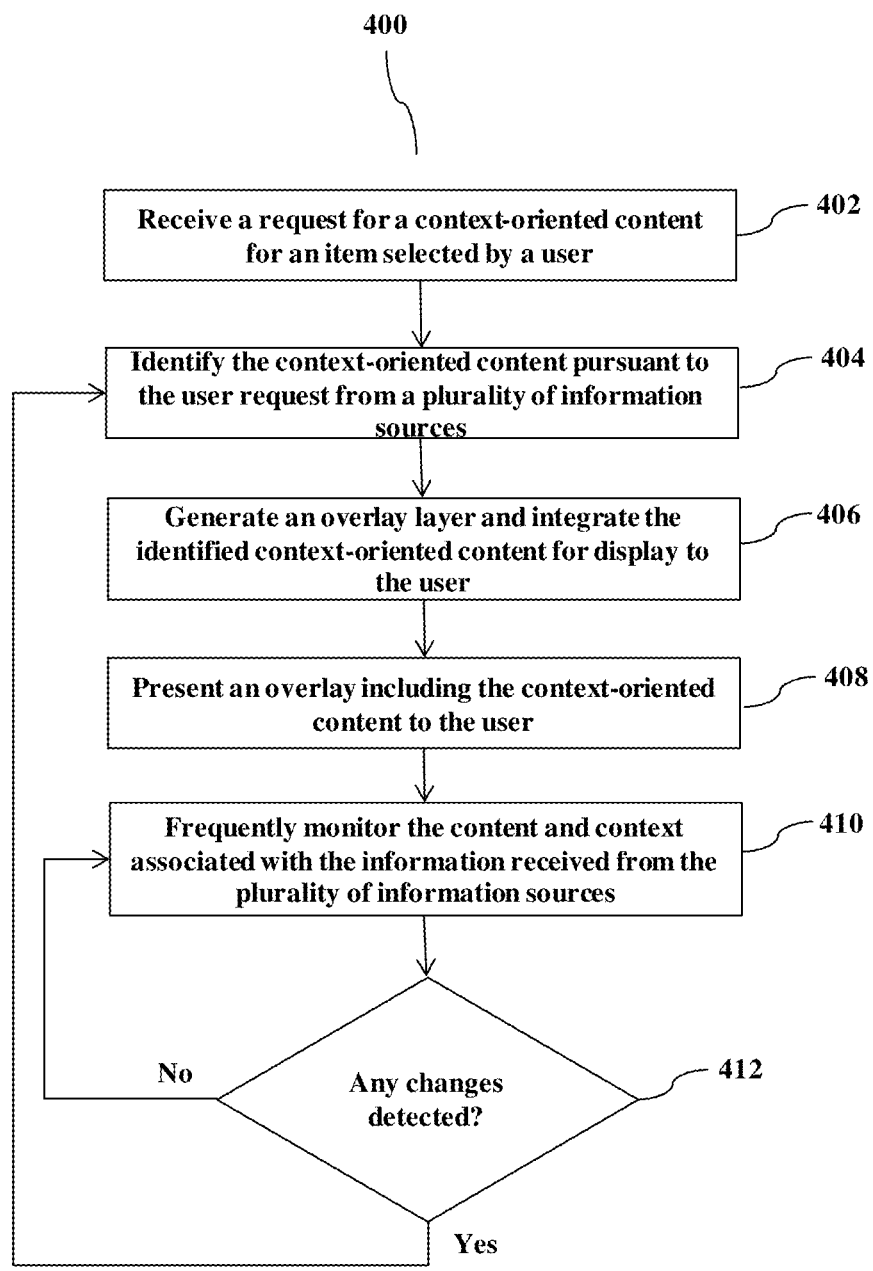

FIG. 5b

Electronic device 102

Electronic reader

Generating electricity from water

There are two primary methods for generating electricity from water. One method uses the energy potential of trapped water in dams in a more sophisticated version of the water wheel, and the other captures ##### from ocean waves. Electricity generated from water is entirely renewable, since water is an abundant natural resource and no water is expended during the electricity generation process. For this reason, many nations rely heavily on hydroelectric power because they want to promote sustainable energy production.

The major adv######### ###### #### ####### ## ### #### ## ####/### cost of operating a hydroelectric plant is nearly immune to in######## ## ### #### ## ###### ##### #### ## ### ####### ###/####, and no imports are needed. The average cost of electricity fro# # ##### ##### ###### #### ## ######### ## # ## # ### ##/ kilowatt-hour.

Hydroelectric ##### #### #### ######## ### ### ##### ## ##### ### ## ######ice after 50–100 years. Operating labor cost is also usually low, a# ##### ### #########, ## ###### ## ######## ####### #######/ormal operation.

Where a dam ### ########### ###### #### ### #### ## #######, ## ### ## ##ded with relatively low construction cost, providing a useful revenu# ###### ## ###### ### ### #### ## ### ########. ## ### #### ##lculated that the sale of electricity from the Three Gorges Dam will cov## ### ########### ##### ##### ## ## #### ## #### #########n. Additionally, some data shows that in most countries large hydropo### ##### #### ### ######## #### ### ## #### ## ###### deliver a positive risk adjusted return, unless appropriate risk managem### ######## ### ######

While many ###### ########## ###### #### ######## ########, some are created to serve specific industrial enterprises. Dedicated hyd######### ##### ###### ##### ## ####### ### ####### amounts of electricity needed for aluminium electrolytic plants, for exa###, ### ######### ### ##### ###### ## ####### ## aluminium in Bellingham, Washington, United States for American Wo#### ### ######### ## ####### ### ######### ##### ########igation and power to citizens (in addition to aluminium power) after t## ######## ## ######## ### ######## ######## ### #nstructed to provide electricity for the Alcoa aluminium industry. New ####### ######## ##### ####### ### ########## ## #pply electricity to the aluminium smelter at Tiwai Point.

Hydro is a fl####### ###### ## ########### ######## ## ### ###### #p and down very quickly to adapt to changing energy demands. Hyd## ###### #### ### #### #### ## ####### ####### ###es. It takes around 60 to 90 seconds to bring a unit from cold start-up #o ##### ####### ######### ### ######## ### ######r steam plants. Power generation can also be decreased quickly when ###### ###### ####### ### #### #### ## ### ####### ##d capacity of hydropower units is not generally used to produce base ##### ##### ##### ## ##### ### #### #### ## ######## #stream needs. Instead, it serves as backup for non-hydro generators.

The cost of h############### ## ########, ###### ## # #########e source of renewable electricity. The average cost of electricity from a hydro plant larger than 10 megawatts is 3 to 5 U.S. cents per kilowatt-hour. Hydro is also a flexible source of electricity since plants can be ramped up and down very quickly to adapt to changing energy demands.

Overlay layer module 210c

Universities/Colleges site
- Hydropower electricity
- Hydropower plants working

Bank sites
- Hydro Plant Electrical Systems
- ◆IEEE Hydroelectric power

Tutor/teacher site
- Hydroelectric power generation - Video lecture
- Hydroelectric power - Video lecture

COLLABORATIVE LEARNING PLATFORM FOR GENERATING AND PRESENTING CONTEXT-ORIENTED CONTENT ON AN ELECTRONIC DEVICE

PRIORITY DETAILS

The present application claims priority from U.S. Ser. No. 61/956,042 filed on 30 May 2013.

TECHNICAL FIELD

The embodiments herein relate to online learning systems and, more particularly to a collaborative learning platform for generating and presenting context-oriented content to a user on an electronic device.

BACKGROUND

A drastic proliferation in web-based learning techniques has lead to their immense popularity in the last few years. Web-based learning techniques have facilitated online education for students, instructors and course-seekers using Internet as a medium. Many distances learning systems have been made available across the globe, and in fact, use of such systems is one of the fastest growing applications of information and communication technology. Many institutions, including but not limited to colleges, universities and even corporate establishments, are instituting e-learning systems as an effective means to dissipate knowledge.

E-learning systems are usually provided with an embedded electronic content reader. The electronic content reader is an interface embedded to the e-learning system that allows students to read course material, textbooks, and other learning materials on their electronic devices such as mobile phones, tablets, laptops, personal digital assistants, and the like. Electronic content readers enhance the user's experience by enabling the users to access, review, modify, and share the contents on the e-learning systems with their peers. However, the need in the art is to explore the collaborative capabilities using the information which may be published time to time to enhance the static information displayed in the electronic content readers and making it more interactive.

Different systems and methods are proposed to enhance these e-learning systems. In one mechanism, the system allows the user to navigate while reading the book through similar set of videos, followed by quiz exercises along with a final test or exam. For example, while reading a textbook a student may require instructor's guidance on a lot of content. The conventional system and method allows the user to manually search various websites, videos, and the like content over the Internet. Alternatively, the student can share the content with the instructor to get the information or explanation associated with the content. As vast amount of data is available on the Internet, the user need to manually search and identify the content related to the context in which the user is looking for the information. Finding such information is in itself a tedious task and takes a lot of user time, especially when the user is not familiar with the content. Further, the user has to navigate through different sets of information websites individually for reading the supporting items in relation to the textbook.

Thus, there is a need of a simple and robust system and method for providing a collaborative learning platform to enhance the user online learning experience by providing the effective on demand and on-the-fly services.

BRIEF DESCRIPTION OF THE FIGURES

The embodiments herein will be better understood from the following detailed description with reference to the drawings, in which:

FIG. 2 illustrates various modules available in the system, according to embodiments disclosed herein;

FIG. 3 expands the features of a secondary content module as described in the FIG. 2, according to embodiments as disclosed herein;

FIG. 4 is a flow diagram illustrating a method for generating and presenting context-oriented content in an virtual overlay on an electronic device of the user, according to embodiments as disclosed herein;

FIGS. 5a-5b shows example illustrations of a selected item and corresponding enhanced context-oriented content overlay presentation, according to embodiments as disclosed herein;

DETAILED DESCRIPTION OF EMBODIMENTS

Figure 1:
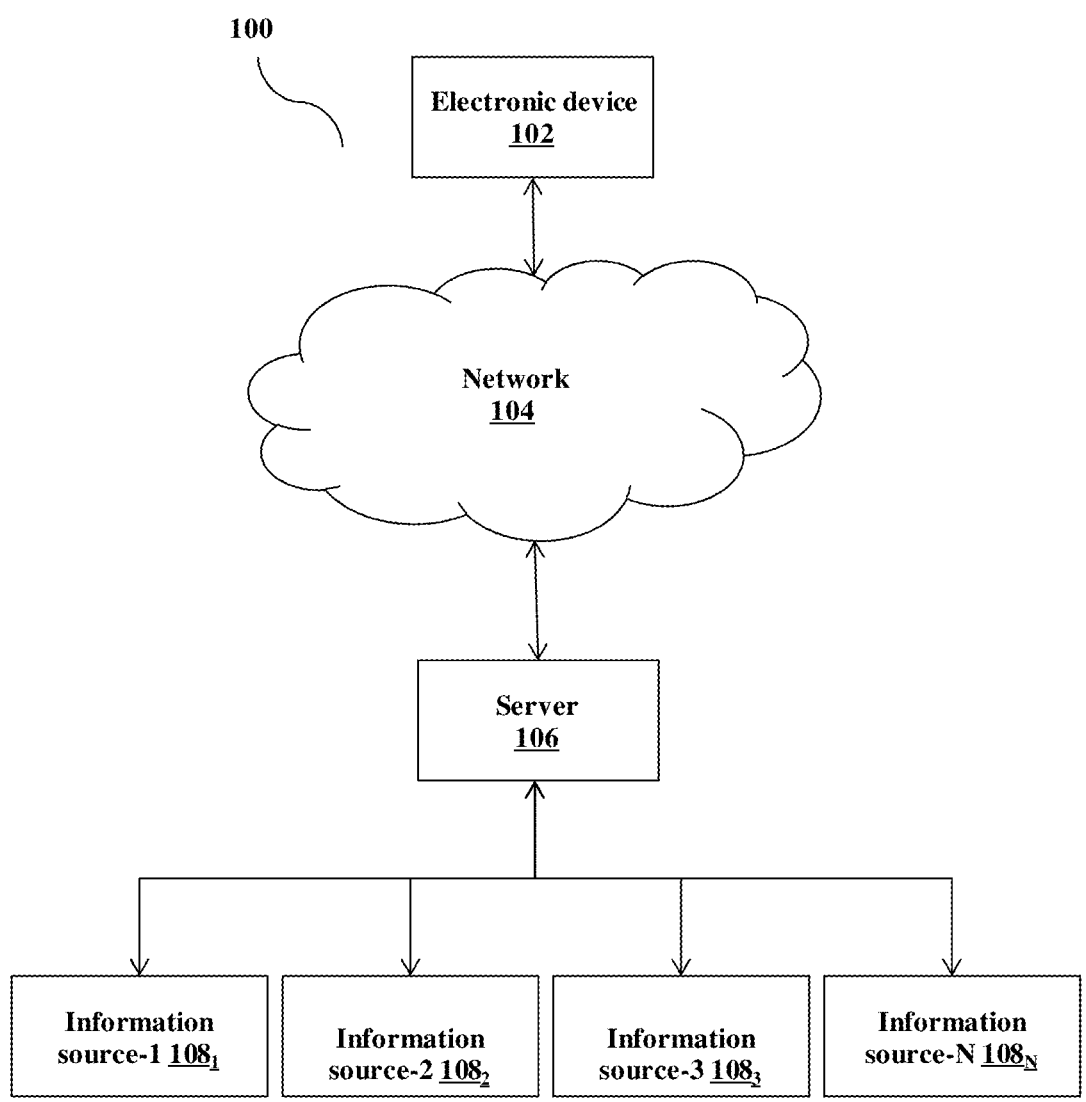
FIG. 1 illustrates generally, among other things, a high level overview of a system, according to embodiments disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as not to unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a system and method for presenting context-oriented content from a plurality of information sources through an overlay layer. The system and method includes an electronic device, a server (may be included in or remotely located from the electronic device), and one or more information sources to provide enhanced context-oriented content to a user while viewing an object (such as webpage, textbook, PDF files, and the like) on the electronic device. The information sources described herein can provide context-oriented content to the user pertaining to a selected item present within the object on the electronic device. The server can be configured to receive the context-oriented content associated with the plurality of information sources in the network. The context-oriented content described herein can be the additional information about the item selected by the user. For example, if the user needs more information or explanation about a topic in the text book then the server can provide the topic information or a lecture from a teacher pursuant to the context of the topic in which the user is referring it. Further, the server is configured to integrate the context-oriented content associated with each information source into a single overlay layer; thereby, generating and presenting an integrated (or consolidated) list of the context-oriented content to the user within the plurality of information sources.

Unlike conventional systems, a collaborated platform to integrate with various information sources and adaptively provide the context-oriented content from the plurality of information sources is provided. Such a collaborated platform can be used to engage the user with the information sources to effectively enhance the user knowledge and experience. Further, the context-oriented content can be adaptively displayed using a transparent overlay which allows the user to clearly identify the additional information or explanation about the item. The static content and online learning experience can be enhanced by presenting the overlay layer including the context-oriented content on the electronic device, such as to significantly decrease the user time for searching the information over the Internet and increase the overall customer experience. The user need not individually navigate different websites to search, analyze, and identify the supporting context-oriented content about the selected item within the object. Furthermore, the overlay can be used as an innovative and capable tool that can transform existing static Internet content such as eBooks and enhance media formats by providing extensible support that can be both online and context driven. Furthermore, the proposed system and method can be readily implemented on the existing infrastructure and may not require extensive set-up or instrumentation.

Referring now to the drawings, and more particularly to FIGS. 1 through 8, where similar reference characters denote corresponding features consistently throughout the figures, there are shown embodiments.

FIG. 1 illustrates generally, among other things, a high level overview of a system 100, according to embodiments disclosed herein. The system 100 can include an electronic device 102, a network 104, a server 106, and one or more information sources $108_{1-N}$ (hereafter referred as information sources(s) 108).

In an embodiment, the electronic device 102 described herein can be for example, but not limited to, gateway device, router, hub, computer, laptop, wireless electronic device, personal digital assistants, smart phone, portable electronic device, consumer electronic device, and the like. The electronic device 102 can be configured to access the information sources 108 through the network 104 to present the context-oriented content to the user. The electronic device 102 can be configured to access the context-oriented content associated with different information sources 108 for a selected item present within an object on the electronic device 102. The object described herein can be for example, but not limited to, a PDF document, a textbook, an article, a web document, and the like. Further, the electronic device 102 can include appropriate interfaces to directly or indirectly communicate with the server 106 and with various other devices over the network 104.

In an embodiment, the network 104 described herein can be for example, but not limited to, wireless network, wire line network, public network such as the Internet, private network, global system for mobile communication network (GSM) network, general packet radio network (GPRS), local area network (LAN), wide area network (WAN), metropolitan area network (MAN), cellular network, public switched telephone network (PSTN), personal area network, a combination thereof, or any other network.

In an embodiment, the server 106 described herein can include for example, but not limited to, gateway device, router, hub, server, computer, laptop, and the like. The server 106 can be configured to communicate with various information sources 108 to provide a collaborative platform. In an embodiment, the information sources(s) 108 described herein can be configured to offer different objects to the user in the network 104. In an embodiment, the objects described herein can include for example, but not limited to, book sites, university sites, tutor/teacher sites, live sessions, slides, PDF documents, series of videos, list of exercises, quiz or exam objects, and any other forms of objects. In an embodiment, the information source 108 can be integrated into an enhanced learning system as part of a distance learning course including an online component. Each information source 108 can provide different objects to the user; thereby, providing supporting objects to enhance the static content. Unlike conventional systems, the server 106 can be configured to provide the collaborative environments to retrieve the context-oriented content pursuant to the user requirement from the various information sources 108. Further, the server 106 can be configured to include appropriate interfaces to connect with the user device 102 through the network 104. For example, while reading a topic "diabetes effects during malaria" in an electronic documents, if the user is looking for an explanation about malaria then the user can send a request to the server 106 either by just highlighting the topic by selecting it or through any other means. The server 106 can be configured to analyze and identify the context and the content received from the information sources 108 and provides the context-oriented content pursuant to the user topic. Further, the server 106 can be configured to present the context-oriented content by using an overlay layer. Unlike conventional systems, the overlay provides substantially virtual transparent background displaying the context-oriented content information received from various information sources 108. Furthermore, the detailed operations performed by the system 100 to generate and present context-oriented content pursuant to the user requirement are described in conjunction with the FIGS. 2 through 7.

Although the FIG. 1 shows a limited number of devices including the user device 102, the server 106, and the information sources 108 coupled to the network 104. In real-time, the devices may also be coupled with each other and may be able to communicate directly, indirectly, remotely, via third-party devices/network among each other. In an embodiment, the system 100 may include more, fewer, or different components. Moreover, one or more devices associated with the network 104 may perform one or more functions/operations of any other device.

FIG. 2 illustrates various modules available in the system 100, according to embodiments disclosed herein. The electronic device 102 or server 106 can be configured to include a secondary content module 202, a display module 204, a storage module 206, a controller module 208, and a communication module 210. In an embodiment, the secondary content module 202 can be configured to include a content module 202a, a context module 202b, and an overlay layer module 202c. The content module 202a can be configured to capture the content for the selected item within the object associated with plurality of information sources 108. For example, the content module 202a can be configured to capture the content on a topic (or item) received from the various information sources 108. In another example, the various information sources may provide different objects (such as documents, slides. Textbook, articles, papers, and the like) which includes different topics, the content module 202b can be configured to capture the same or substantially similar topics from the various objects, such as to effectively analyze and provide enhanced information to the user.

Further, the context module 202b can be configured to extract context information of the objects or context of the information in which the item is described, such as to provide only context-oriented content pertaining to the selected item of the user. In an embodiment, the context-oriented content described herein can include for example, but not limited to, slides, PDF documents, series of videos, list of exercises, quiz or exam objects, and any other forms of content. For example, if the user is looking for information about an item "Malaria" but in content of "diabetes" then the context module 202b can be configured to extract the content about the malaria from various information sources 108 which are described in context of "diabetes". Unlike conventional system, instead of abstractly providing information to the user, the secondary module 202 can be configured to provide effective information by efficiently identifying the context-oriented content pursuant to the user requirement. Note that the context-oriented content described herein provides enhanced or additional information about the item other than what is already described therein.

Further, the secondary content module 202 can be configured to display the context-oriented content on the electronic device 102 of the user using an overlay layer. The overlay layer module 202c can be configured to generate the overlay layer and integrate the context-oriented content references identified thereon.

In an embodiment, the display module 204 can be configured to display the content on the electronic device 102 of the user. The storage module 206 can be configured to store various items, objects, information about overlay layers, and the like. The storage module 206 can be configured to store control instructions to perform various operation in the system 100. Further, the controller module 208 can be configured to control the various operation of the system 100. The controller module 208 can be configured to receive the user selected item request within the object to extract the context-oriented content associated with the information sources 108. The controller module 208 can be configured to present the extracted objects associated with the plurality of information sources 108 to the secondary content module 202 to extract the context-oriented content pursuant to the user requirement.

FIG. 3 expands the features of the secondary content module 202 as described in the FIG. 2, according to embodiments as disclosed herein. As depicted in the FIG. 3, the secondary content module 202 can be configured to communicate with the plurality of information sources 108 through the network 104. The secondary content module 202 can be configured to continuously monitor and receive the objects (1-N) associated with each information sources 108 throughout the network 104.

In an example, when a user views any object on an electronic device 102 and if the user selects an item of interest to learn more about it then the secondary content module 202 can be configured to identify one or more information sources 108 best suited or likely to adequately provide the requested context-oriented content pertaining to the user selected item within the object.

In an embodiment, the secondary content module 202 can be configured to receive a request including the item (or topic) selected by the user and context of the item (i.e., the context in which the topic is described in the document) from the electronic device 102 of the user. In response to receiving the request, the secondary content module 202 can be configured to identify the content received from the information sources 108 which is also described in similar or substantially similar context pursuant to the user. In an embodiment, the secondary content module 202 can be configured to determine whether any of the information is available to directly provide a live lecture to help the user. For example, if a lecturer can provide a live presentation or live chat to explain the topic of interest to the user. This may significantly increase the user experience with the e-learning systems. Unlike conventional systems, an interactive e-learning platform can be provided which actively engages the user with the information sources to effectively enhance the user knowledge and experience.

Further, the secondary content module 202 can be configured to allow the user to view the context-oriented content provided by the plurality of information sources 108. Unlike in conventional systems, the users need not navigate through different websites or manually search and identify the context-oriented content. The user can readily view the displayed context-oriented content provided by the plurality of information sources 108 to enhance their knowledge on the selected item.

FIG. 4 is a flow diagram illustrating a method 400 for generating and presenting context-oriented content in a virtual overlay on an electronic device 102 of the user, according to embodiments as disclosed herein. The various steps of the method 400 are summarized into individual blocks where some of the blocks can be performed by the electronic device 102, the server 106, the information source 108, and the like. The method 400 and other description described herein provide a basis for a control program which can be easily implemented using a microcontroller, microprocessor, or equivalent thereof.

In an embodiment, at step 402, the method 400 includes receiving a request for a context-oriented content for an item selected by a user on an electronic device 102. In an example, the method 400 allows the controller module 208 to receive the request including the item (or topic) and the context in which the item is described in an object from the user on an electronic device 102. The method 400 allows the controller module 208 to extract the content and context of the item within the object viewed by the user on the electronic device 102. For example, while reading an electronic Hollywood Magazine if the user want to know about politics then the method 400 allows the controller module 208 to receive the request from the user including the item as "politics" and context in which the politics information required is in "Hollywood". Further, the method 400 allows the controller module 208 to communicate the request indicating the user is looking for information on "politics in Hollywood" to the secondary content module 202 to retrieve the context-oriented content from various information sources 108.

In an embodiment, at step 404, the method 400 includes identifying the context-oriented content pursuant to the user request from the plurality of information sources 108 over the network 104. In an example, the method 400 allows the secondary content module 202 to identify the context-oriented content from the plurality of information sources 108 by using context module 202b. The method 400 allows the context module 202b to identify the context-oriented content from the plurality of information sources 108 pursuant to the user selected content and context in which the content is described. Unlike conventional system, a collaborated platform to integrate various information sources and adaptively provide the context-oriented content from the plurality of sources is provided. Such a collaborated platform can be used to engage the user with the information sources to effectively enhance the user knowledge and experience. For example, the secondary content module 202 may choose the content from the information sources which describes the "politics in Hollywood"; thereby, avoiding any other content related to only "politics" or "Hollywood" or "office politics" and the like. In an embodiment, the method 400 allows the secondary content module 202 to identify if any of the information sources 108 is available to provide live presentation to the user on the requested topic. For example, the secondary content module 202 may check the individual information source to determine whether any one of them can do a live chat, or provide a lecture to the user on the "politics in Hollywood".

In an embodiment, at step 406, the method 400 includes generating an overlay layer and integrating the identified context-oriented content for display to the user. In an example, the method 400 allows the secondary content module 202 to integrate context-oriented content from plurality of information sources 108 into a substantially virtual transparent background overlay layer. In an embodiment at step 408, the method 400 includes presenting the overlay layer on the electronic device 102 of the user. Unlike conventional systems, the static content and online learning experience can be enhanced by presenting the overlay layer including the context-oriented content on the electronic device 102, such as to significantly decrease the user time for searching the information over the Internet and increase the overall customer experience. The user need not to individually navigate different websites to search, analyze, and identify the supporting context-oriented content about the selected item within the object.

In an embodiment, at step 410, the method 400 includes frequently monitoring the content and the context associated with the information received from the plurality of information sources 108. In an example, the method 400 allows the secondary content module 202 to monitor the content and context associated with the information received from plurality of information sources 108 to provide seamless services to the user. In an embodiment, at step 412, the method 400 includes determining whether changes detected in the content and context associated with the information received from the information sources 108. In response to determining any change in the content and context associated with the information received from the information sources 108, the method 400 includes repeating the steps 402 to 412.

The various actions units, steps, blocks, and acts described in the method 400 may be performed in the order presented, in a different order, or simultaneously. Further, in some embodiments, some actions, units, steps, blocks, and acts listed in the FIG. 4 may be omitted, added, skipped, and modified without departing from the scope of the embodiment.

Figure 5A:
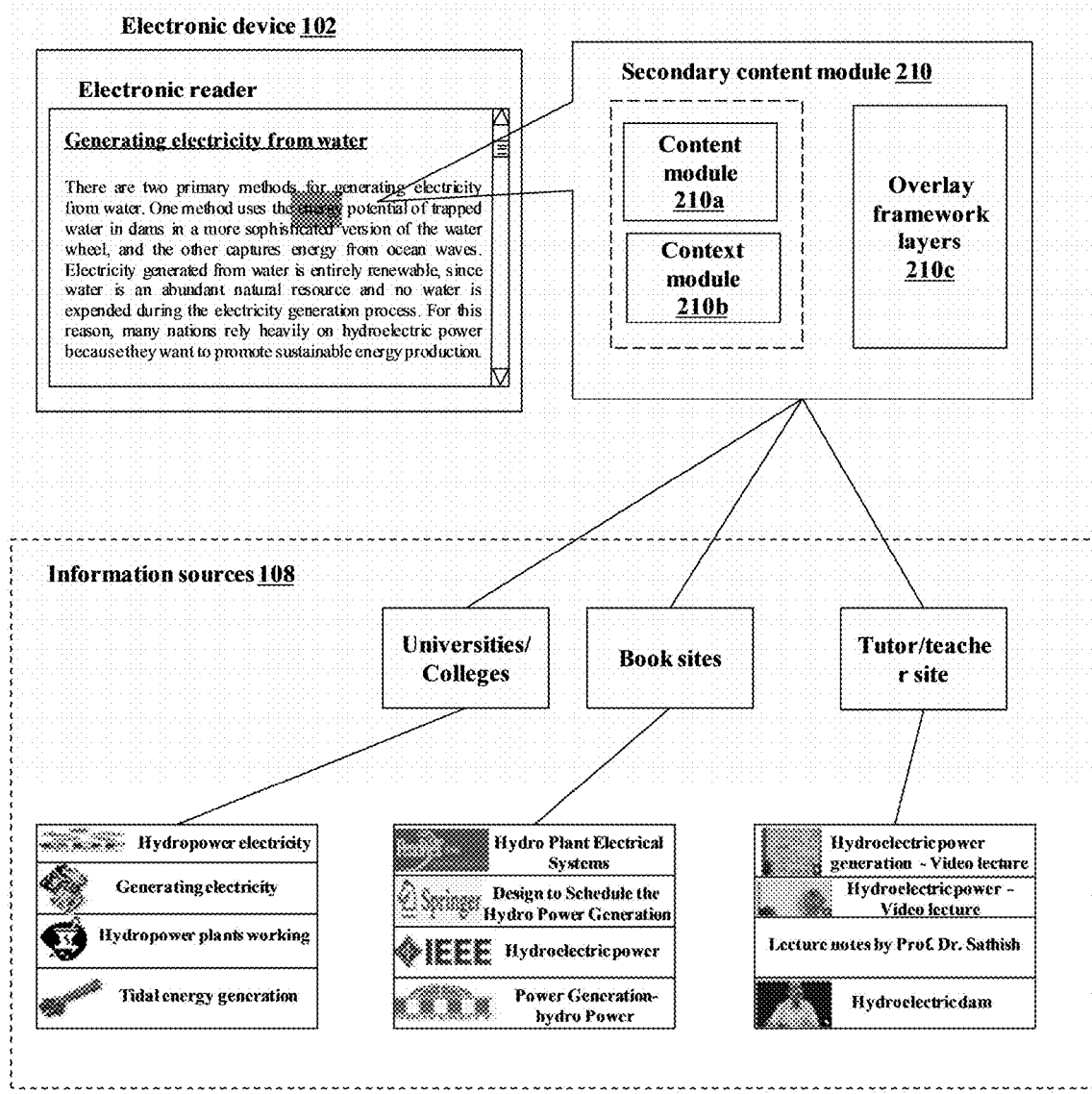

FIGS. 5a-5b shows example illustrations of a selected item and corresponding enhanced context-oriented content overlay presentation, according to embodiments as disclosed herein. The secondary content module 202 can receive the context-oriented content request for an item such as "Energy" from the user on the electronic device 102 as shown in the FIG. 5a. The secondary content module 202 can be configured to parse the university/college sites, an author sites (for example, Resnick, Halliday, and the like.), a secondary content publisher site (for example, Khan academy, and the like), an eBook vendor site (for example, Amazon, Ebay, and the like), a third party tutorial provider sites (for example, Spark notes, Barrons, and the like), a social networking sites (for example, Facebook, Twitter, Yahoo, and the like), a cloud application provider sites, a book publisher sites (for example, Wiley), a teacher/tutor sites (for example, Dr. Joe Smith @ University of California, Berkeley, and the like), and the like associated with the plurality of information sources 108 to identify the context-oriented content pursuant to the user request. The university/college sites, author sites, secondary content publisher site, eBook vendor site, third party tutorial provider sites, social networking sites, cloud application provider sites, book publisher sites, teacher/tutor sites, and the like described herein may provide the content in the form of slides, PDF documents, and series of videos, and the like. For example, only that content from the university/college sites, author sites, secondary content publisher site, eBook vendor site, third party tutorial provider sites, social networking sites, cloud application provider sites, book publisher sites, teacher/tutor sites, and the like is extracted as relevant to the user request which describes the "energy in context of electricity generation and water". Further, the secondary content module 202 can be configured to generate an overlay layer with substantially transparent background such as to present the context-oriented content to the user, such as shown in the FIG. 5b. In an embodiment, the generated overlay layer can be, for example, independent of the book or part of the book.

Figure 6A:
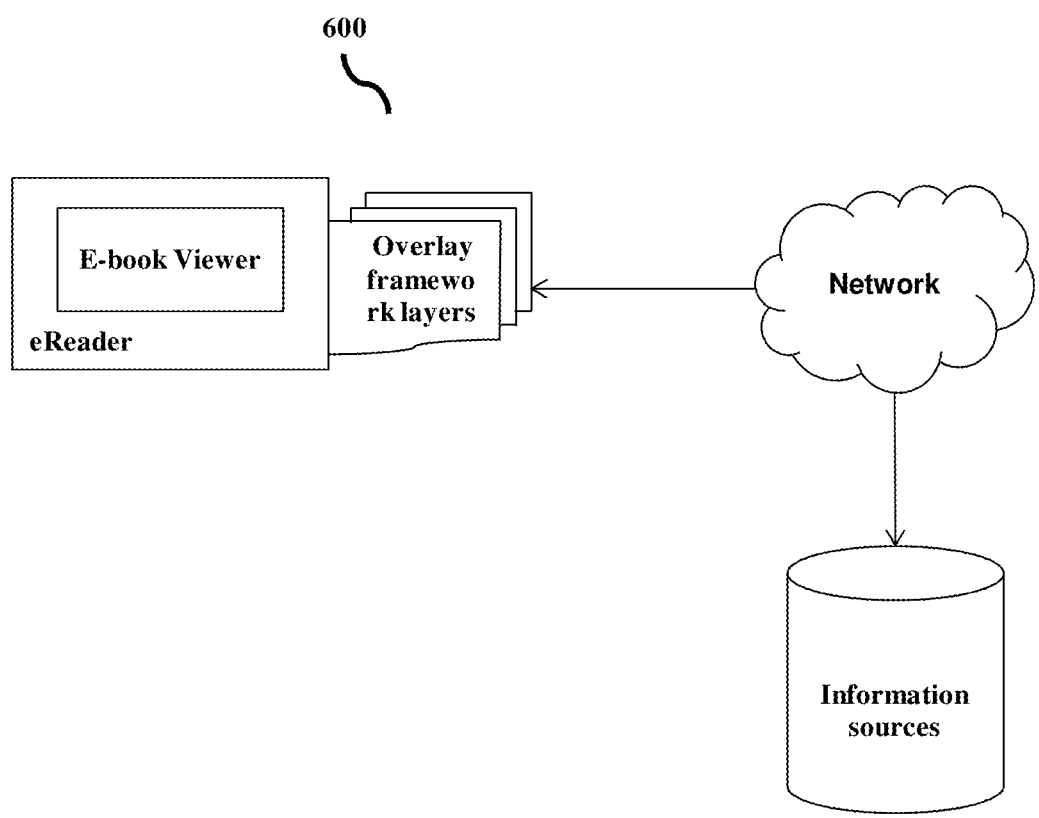
FIGS. 6a-6i shows example illustrations of an item selected by a user on an E-book reader and corresponding enhanced context-oriented content overlay presentation, according to embodiments as disclosed herein.

FIGS. 6a-6i shows example illustrations of an item selected by a user on an E-book reader and corresponding enhanced context-oriented content overlay presentation, according to embodiments as disclosed herein. The FIG. 6a shows an eReader for viewing an E-book by a user. The e-Reader is made extensible by means for communicating with the plurality of information sources 108 over the network. In an embodiment, the eReader with overlay can be a local or remote display application using remote desktop or Virtual Desktop Infrastructure (VDI) based server side application where a large number of books could be accessed and stored.

Figure 6B:
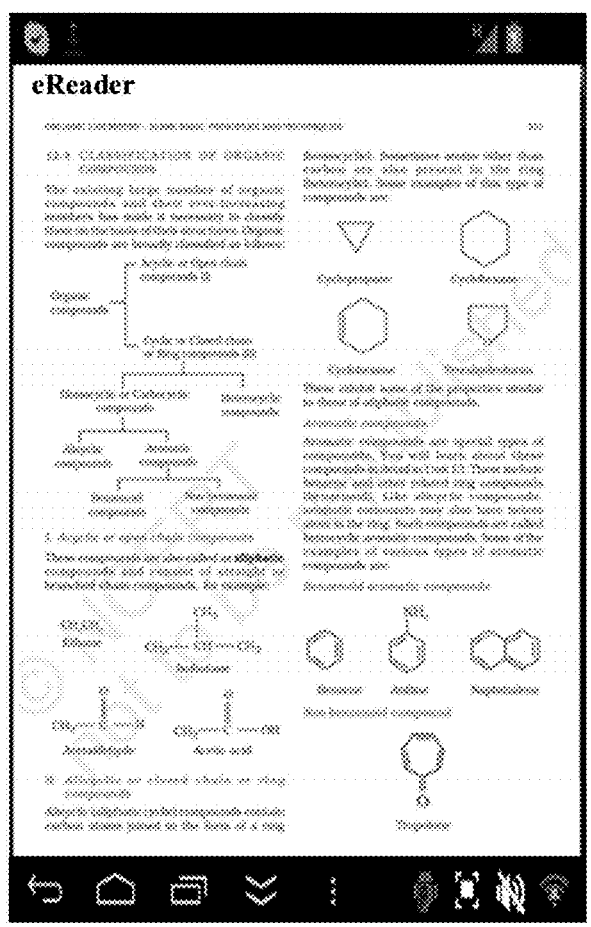
Figure 6C:
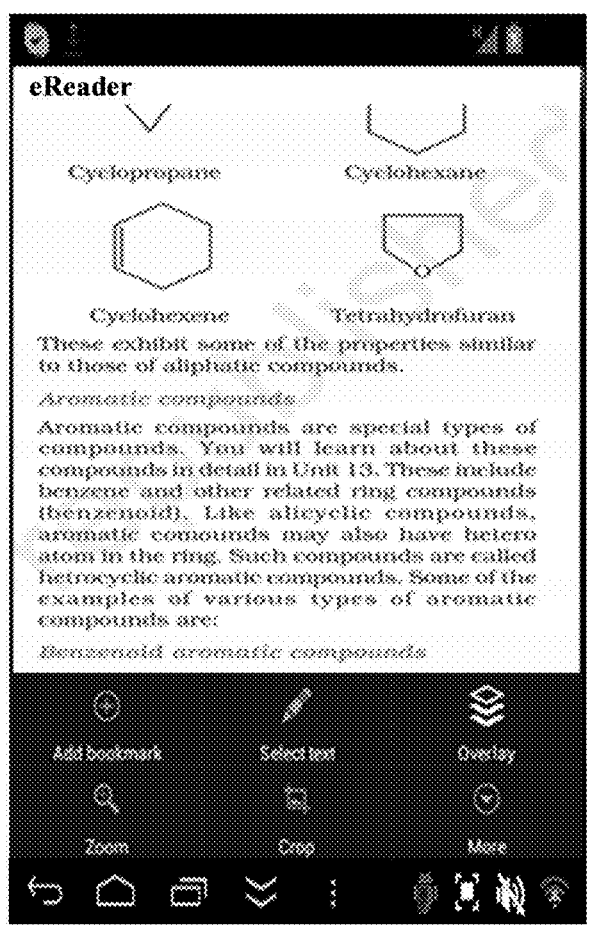

The user can view an eBook using the book reader as shown in the FIG. 6b. The FIG. 6c shows an example eBook reader on which the menu bar is projected including overlay framework layer as one of the option to the users to extract context-oriented content. The overly framework can be annotated based on the book content and interactively provide the context-oriented content to the page the user is on or based on a selected item. Further, the overlay layer provides an interface when there is a live conversation or presentation by any of the information source. Videos, quizzes, course material with homework and other forms of content can be integrated from various information sources into the platform to provide an interactive learning process to the users. In an embodiment, the virtual overlay can be single layered or multilayered having a substantially transparent background. Further, the overlay facilitates live instruction by allowing interactive live sessions between the teacher, student, or a combination thereof.

Figure 6D:
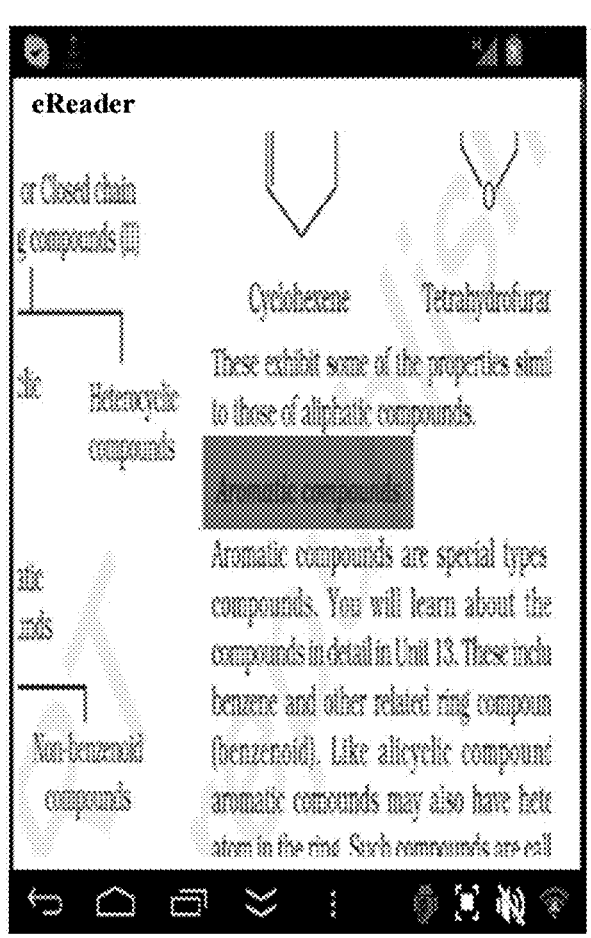
Figure 6E:
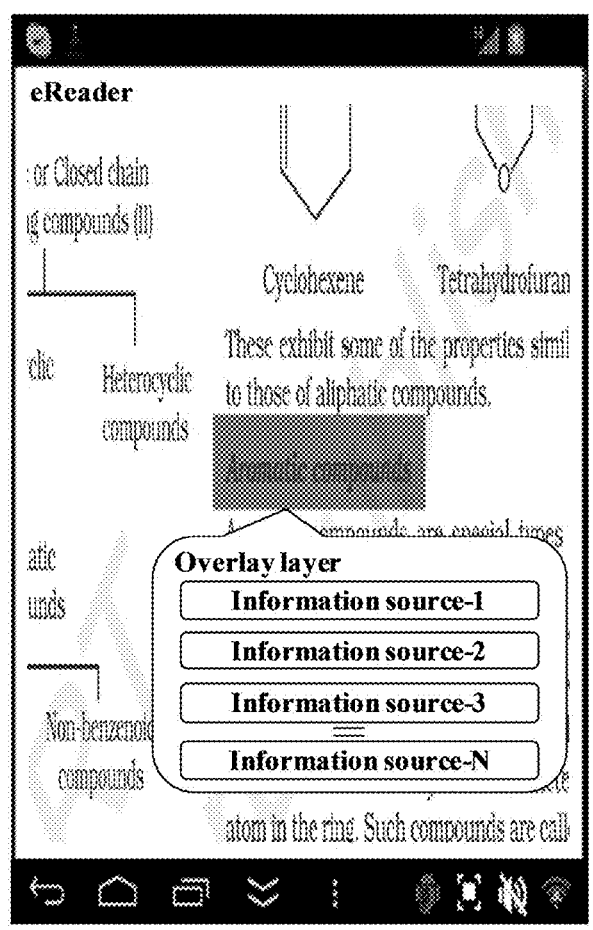
Figure 6F:
Figure 6G:
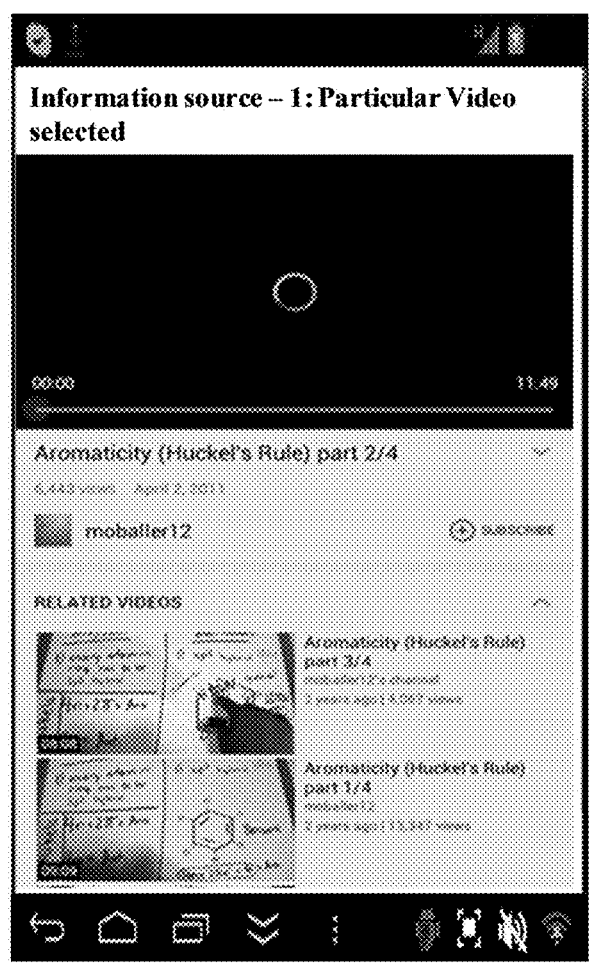
Figure 6H:
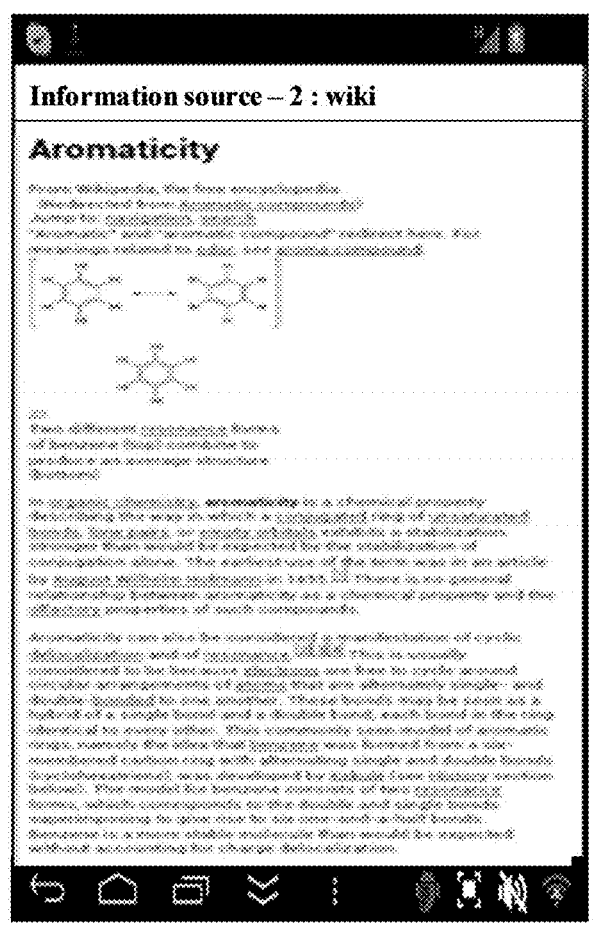
Figure 6I:
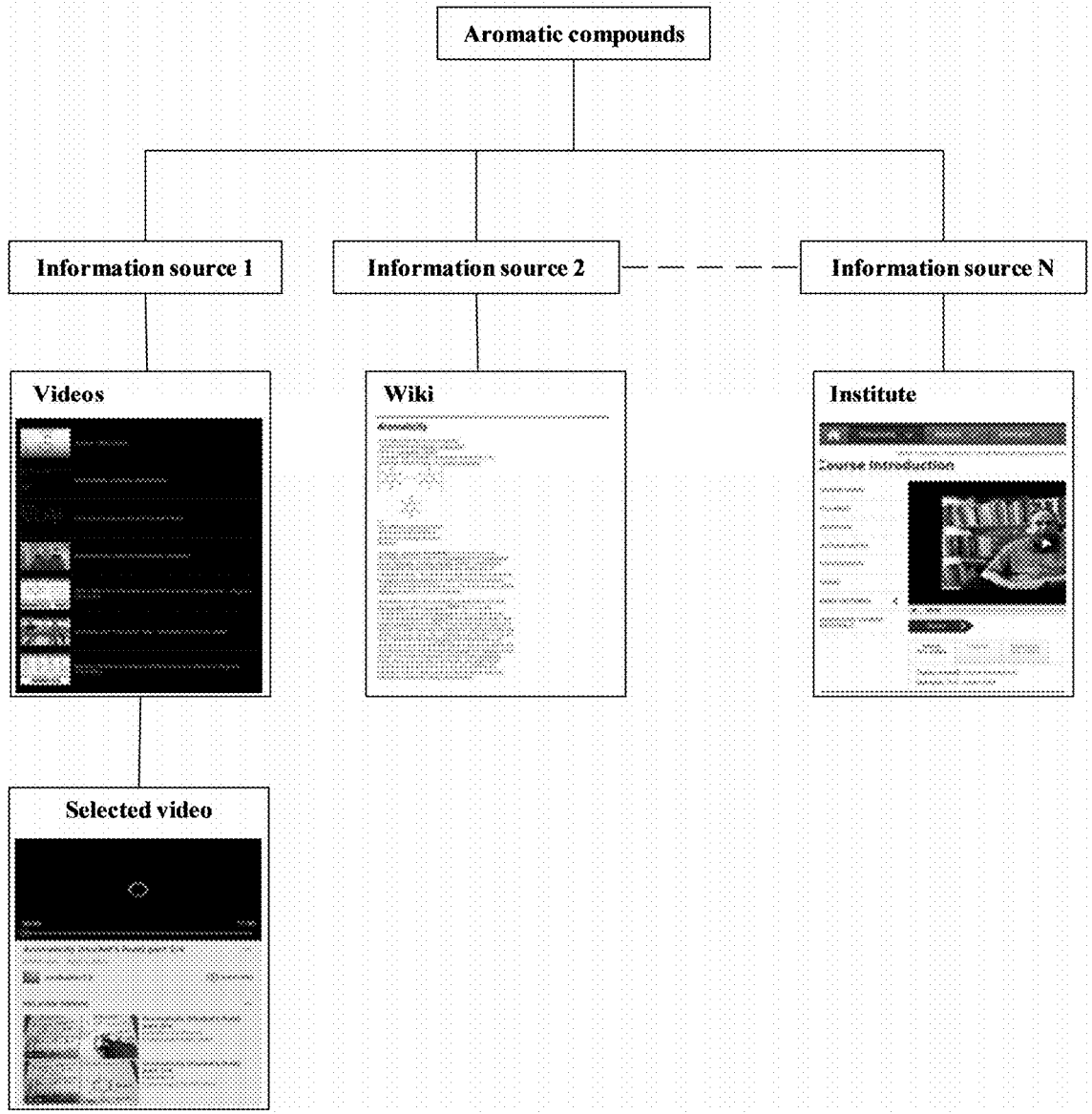

The FIGS. 6d and 6e shows an example eBook reader in which the item "Aromatic Compounds" is selected by the user to extract the context-oriented content from the plurality of information sources pursuant to the user requirement. An overlay layer linking the context-oriented content received from the plurality of information sources can be presented to the user for the selected item "Aromatic Compounds".

The FIGS. 6f-6i show an example eBook reader depicting context-oriented videos, wiki website, and the like to the user. The user can select and read the context-oriented content using conventional methods. Unlike in conventional systems, the users need not navigate through different websites or manually search and identify the context-oriented content. The user can readily view the displayed context-oriented content provided to enhance their knowledge on the item.

It is to be understood that the content described with respect to the FIG. 6 is only for illustrative purpose and does not limit the scope of the embodiment. Further, a person having ordinary skill in art can identify that the overlay and the information can be implemented and presented in any form. In an embodiment, the overlays can be both layered as well as structured. The initial overlay layer can originate in a website or as part of a web service or can be downloaded along with the book or as part of a subscription by the user. Further, any of the affiliates in the overall education process or an unrelated entity can supply the overlay as requested by the user, the educator, a related entity providing the educational service, and the like. Further, the overlay layer can provide a starting point for the enhanced reader. The overlay in fact need not know much about the book but its ability to leverage supporting context-oriented content lends its greater utility.

In an embodiment, the overlay can be a single layered or multi-layered, where each layer can use a sub-layers below it or can be built on itself to allow a teacher to annotate on top of the displayed overlay or customize the existing overlay content. Further, the overlay can be configured to facilitate live instructions by allowing an interactive live session between the teacher and students. In an embodiment, multiple live sessions can be used as a part of the overlay. For example, a teacher or part time tutor can be a part of the overlay and the user can click a link to bring up a live person. In another embodiment, the overlay can include "CLICK TO BE TAUGHT" button to bring a live session from a teacher or online tutor when requested by the user. The teacher or part time tutor can go to a website and deliver a live presentation. Furthermore, the overlay can include existing notes to annotate what is read and what is said, by adding context-sensitive blogs and other enhancements to the content. Furthermore, any student who has attempted a problem in the book or in the homework can make notes or provide hints and suggestions as a part of the overlay.

In an embodiment, for a traditional book there are a range of overlays that can be possible. The overlay can be used to add number of hyperlinks to a page as most of the books do not have hyperlinks. Further, as the user navigates, an index of hyperlinked overlays are read and added to the content which leads to a simple enhancement. The part of the links that the user can access within the traditional book can include video based links to various sites, link to questions and quizzes, link to various Wikipedia articles that are context sensitive to the book. Furthermore, a link can pop-up a dialogue to a live teacher which helps the user to take real time classes when the user is reading the book, or provides a webpage to the blog or a social site that is discussing about the particular material, or allow the user to have a multi-modal social dialog, or and the like.

In an embodiment, the multi-layered overlay can include a language translation sub overlay layer provided to the user. The language translation service of the overlay can be used to translate the entire text or a portion of the text into the user requested language. Further, the translation could also take the form of spoken voice in a different language or a dialect. For example, the language translation service may automatically determine the language of the content and display the translation of the content in the form of a user-selected language using a popup window or other user interface element. The features of a particular overlay can be turned on or off or else one or several sub-layers in a multilayered overlay can be turned off. For example, the language translation service provided by the overlay can be turned off say by default and then turned on at the behest of the user.

Figure 7A:
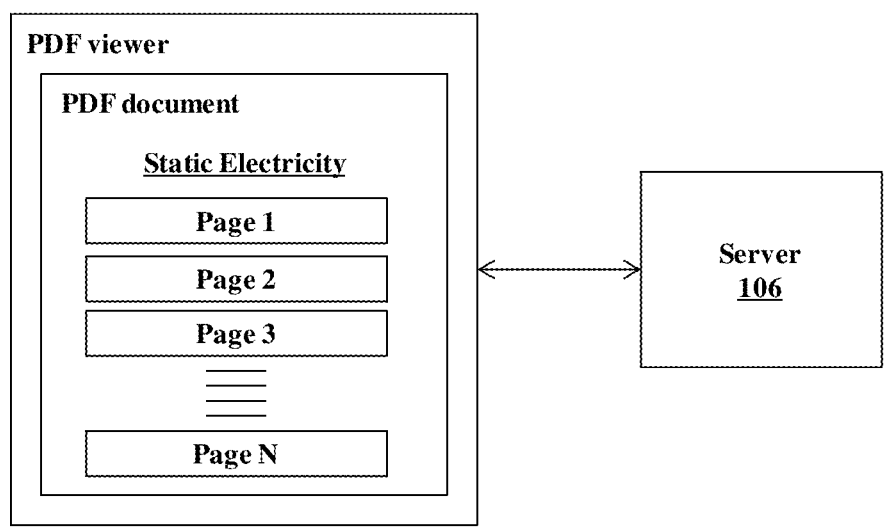
FIGS. 7a-7b shows other example illustrations of generating and presenting context-oriented content in a PDF viewer in the electronic device, according to embodiments as disclosed herein.
Figure 7B:
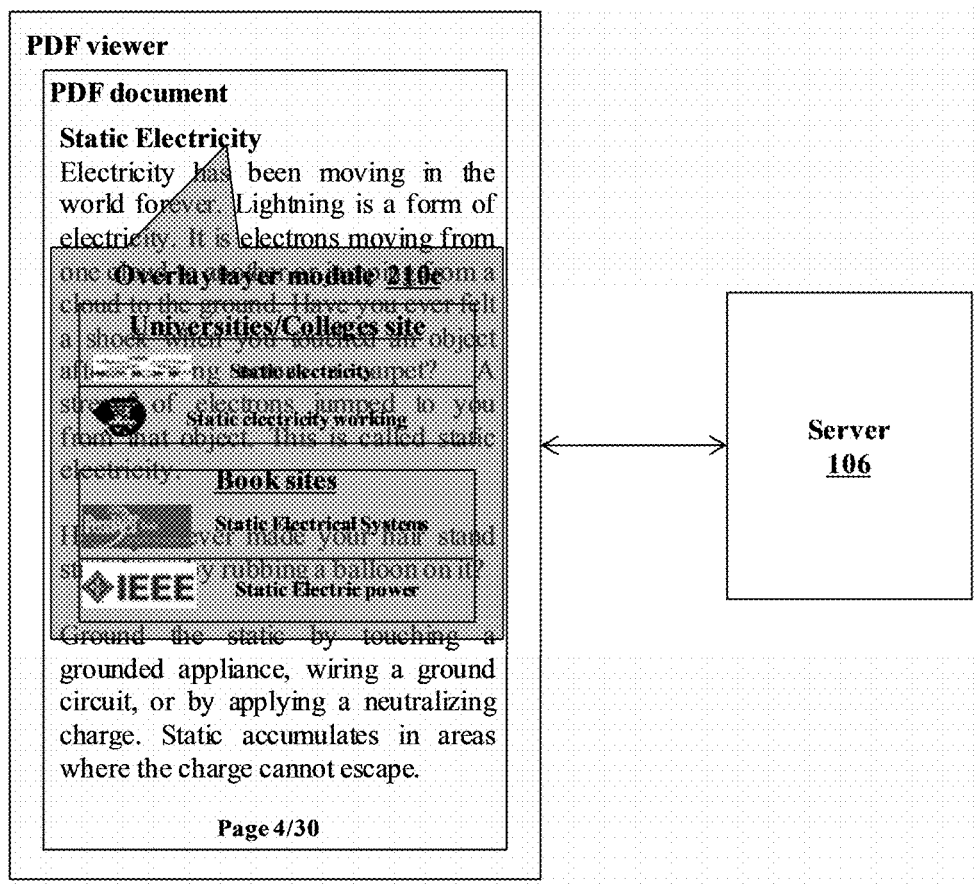

FIGS. 7a-7b shows other example illustrations of generating and presenting context-oriented content in a PDF viewer in the electronic device 102, according to embodiments as disclosed herein. In an example, a PDF document for a particular topic/lecture can be opened in the PDF viewer by a user. The PDF document may include many pages for the particular topic describing various sections of the topic, such as shown in FIG. 7a. The server 106 can be configured to store the context-oriented content associated with each sub-topic present in different pages of the PDF document. In an embodiment, the context-oriented content can be stored in a structured way on to the server 106. For example, the all the topic associated with the page 1 along with its context in which each topic is described is stored in the server 106, such as to allow the server 106 to map and identify the context-oriented content associated with various sources in response to receiving a request front the user. The mapping can be maintained between the server 106 and the content associated with various information sources to present the context-oriented content pursuant to the user request on the PDF viewer.

As soon as the user flips to next page or initially view the document using the PDF viewer, the main and sub-topics present in the chapter along with the respective page number can be sent to the server 106 for extracting the context associated with each topic and the context in which the topics are described. In an example, the information about the content and context associated with the topics on respective pages may provide to the server 106 in the form of metadata or XML file. The server 106 can be configured to parse the metadata or XML file to extract the context associated with each topic and the context in which the topics are described. Upon extracting the context and content information of the topic, the server 106 can be configured identify the context-oriented content pursuant to the topic present in the respective page and sent it to the PDF viewer application. For example, as shown in the FIG. 7b, the PDF viewer a document describing a sub-topic "STATIC ELECTRICITY" on the "PAGE 4".

The server 106 can be configured to identity the context-oriented content associated with the sub-topic from various information sources. The context-oriented content identified in this example can be, but not limited to, the information which is describing "the electricity" which is "static in nature" or the information about "the electricity" which posses "static properties". Further as shown in the FIG. 7b, the server 106 can be configured to present the context-oriented content as an overlay layer in the PDF document to present the context-oriented content. Note that the overlay layer described herein can be independent of the PDF viewer or can be a part of the PDF viewer.

Figure 8:
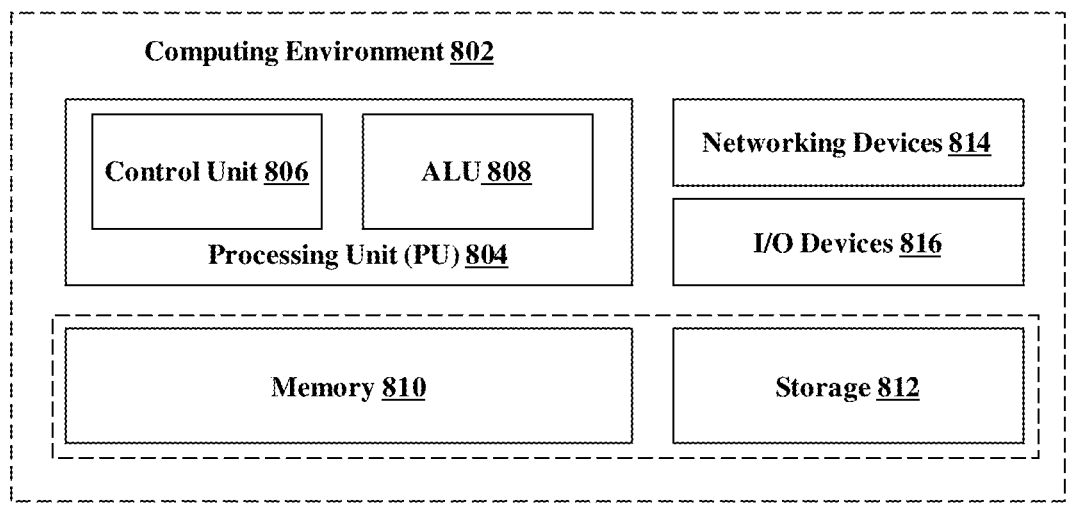
FIG. 8 is a computing environment for implementing the system and the method described herein, according to embodiments as disclosed herein.

FIG. 8 illustrates a computing environment 802 implementing the method and systems as disclosed in the embodiments herein. As depicted the computing environment 802 comprises at least one processing unit 804 that is equipped with a control unit 805 and an Arithmetic Logic Unit (ALU) 808, a memory 810, a storage unit 812, plurality of networking devices 814 and a plurality Input output (I/O) devices 815. The processing unit 804 is responsible for processing the instructions of the algorithm. The processing unit 804 receives commands from the control unit 805 in order to perform its processing. Further, any logical and arithmetic operations involved in the execution of the instructions are computed with the help of the ALU 808.

The overall computing environment 802 can be composed of multiple homogeneous or heterogeneous cores, multiple CPUs of different kinds, special media and other accelerators. The processing unit 804 is responsible for processing the instructions of the algorithm. Further, the plurality of processing units 804 may be located on a single chip or over multiple chips.

The algorithm comprising of instructions and codes required for the implementation are stored in either the memory unit 810 or the storage 812 or both. At the time of execution, the instructions may be fetched from the corresponding memory 810 or storage 812, and executed by the processing unit 804.

In case of any hardware implementations various networking devices 814 or external I/O devices 815 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1-8 include blocks which can be at least one of a hardware device, software module, or a combination thereof.

The embodiment disclosed herein specifies a system and method for presenting context-oriented content from a plurality of information sources. The mechanism can automatically make decisions on appropriate services used by the user and generate aggregated bill for the user. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with Application programming interfaces (APIs) and software programs written in e.g. Very high speed integrated circuit Hardware Description Language (VHDL), XML (Extensible Markup Language), Asynchronous JavaScript and XML (AJAX), jQuery, Java, or an equivalent thereof. Several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means or at least one software means. The method embodiments described herein could be implemented in pure hardware or partly in hardware and partly in software. Alternatively, the embodiment may be implemented on different hardware devices, e.g. using a plurality of CPUs.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for presenting at least one context-oriented content from a plurality of information sources, the method comprising:
    displaying an existing static electronic document downloaded from an existing eBook or other existing website with content on an electronic device, wherein said existing static electronic document comprises existing static content;
    detecting, by the electronic device, a static text item selected in said existing static electronic document displayed on the electronic device;
    sending, by the electronic device, a request for context-oriented content associated with the selected static text item to a server;
    receiving, by the server, the request comprising the selected static text item from said electronic device;
    receiving, by the server, information from at least one information source from the plurality of information sources;
    extracting a context of said at least one information source and a context in which the selected static text item is described wherein extracting the context in which the selected static text item is described in the existing static electronic document comprises:
        detecting a current page of the existing static electronic document displayed on the electronic device,
        receiving main topic and sub-topic described in the current page of the existing static electronic document displayed on the electronic device, and
        extracting the context in which the selected static text item is described in the existing static electronic document based on the main topic and the sub-topic described in the current page of the existing static electronic document displayed on the electronic device;
    identifying a context-oriented content from said information received from said at least one information source based on said context of said at least one information source and said context in which the selected static text item is described in the existing static electronic document, wherein said identified context-oriented content provides enhanced content over said selected static text item of said existing static electronic document;
    generating at least one overlay including said identified context-oriented content providing enhanced content over said selected static text item, wherein said overlay comprises at least one layer configured to provide at least one service corresponding to said identified context-oriented content; and presenting said at least one overlay corresponding to said selected static text item with said enhanced content overlaying said existing static electronic document, wherein said overlay comprises a substantially transparent background.

2. The method of claim 1, wherein said request comprises at least one of content associated with said selected static text item, and context information of said existing static electronic document, wherein said existing static electronic document is one of an electronic book, and electronic slides viewed through a document viewer application.

3. The method of claim 1, wherein said method further comprises:
receiving an information source, corresponding to the identified context-oriented content, selected from said overlay; and
presenting said identified context-oriented content from said selected information source using said at least one service within said at least one layer of said overlay, wherein said at least one service of said at least one layer is selectively controlled.

4. The method of claim 1, wherein said method further comprises storing said at least one overlay in a memory on said electronic device, wherein said identified context-oriented content in said at least one overlay is stored in a structured way, wherein said at least one overlay comprises a link linking said identified context-oriented content received from the said at least one information source presented to said user for said selected static text item.

5. The method of claim 1, wherein said method further comprises storing said at least one overlay in at least one server accessible by said electronic device, wherein said identified context-oriented content in said at least one overlay is stored in a structured way.

6. The method of claim 1, wherein said method further comprises:
frequently monitoring said at least one of content and context associated with said selected static text item of said existing static electronic document from said plurality of information sources; and
updating said at least one overlay and said at least one service associated with said at least one layer in response to said monitoring.

7. The method of claim 1, wherein said information source is integrated into an enhanced learning system as part of a distance learning course including an online component.

8. A learning system for presenting at least one context-oriented content, wherein the learning system comprises:
a plurality of information sources to provide information to enhance knowledge on an existing static electronic document;
an electronic device displaying said existing static electronic document downloaded from an existing eBook or other existing website, wherein said existing static electronic document comprises static content; detecting a static text item selected in said existing static electronic document displayed on the electronic device; and sending a request for context-oriented content associated with the selected static text item;
a server connected to the electronic device and the plurality of information sources, wherein the server comprising a secondary content module configured to:
receive from said electronic device the request comprising the selected static text item from said electronic device;
receive the information from at least one information source from the plurality of information sources;
extract a context of said at least one information source and a context in which the selected static text item is described, wherein extracting the context in which the selected static text item is described in the existing static electronic document comprises:
detecting a current page of the existing static electronic document displayed on the electronic device,
receiving main topic and sub-topic described in the current page of the existing static electronic document displayed on the electronic device, and
extracting the context in which the selected static text item is described in the existing static electronic document based on the main topic and the sub-topic described in the current page of the existing static electronic document displayed on the electronic device;
identify a context-oriented content from said information received from said at least one information source based on said context of said at least one information source and said context in which the selected static text item is described in the existing static electronic document, wherein said identified context-oriented content provides enhanced content over said selected static text item of said existing static electronic document;
generate at least one overlay including said identified context-oriented content providing enhanced content over said selected static text item, wherein said overlay comprises at least one layer configured to provide at least one service corresponding to said identified context-oriented content; and
present said at least one overlay corresponding to said selected static text item with said enhanced content overlaying said existing static electronic document, wherein said overlay comprises a substantially transparent background.

9. The system of claim 8, wherein said request comprises at least one of content associated with said selected static text item, and context information of said existing static electronic document, wherein said existing static electronic document is one of an electronic book, and electronic slides viewed through a document viewer application.

10. The system of claim 8, wherein said secondary content module is further configured to:
receive an information source, corresponding to the identified context-oriented content, selected from said overlay; and
present said identified context-oriented content from said selected information source using said at least one service within said at least one layer of said overlay, wherein said at least one service of said at least one layer is selectively controlled.

11. The system of claim 8, wherein said secondary content module is further configured to store said at least one overlay in a memory on said electronic device, wherein said identified context-oriented content in said at least one overlay is stored in a structured way, wherein the said at least one overlay comprises a link linking said identified context-oriented content received from the said at least one information source presented to said user for said selected static text item.

12. The system of claim 8, wherein said secondary content module is further configured to store said at least one overlay in at least one server accessible by said electronic device, wherein said identified context-oriented content in said at least one overlay is stored in a structured way.

13. The system of claim 8, wherein said content module is further configured to:
frequently monitor said at least one of content and context associated with said text item of said existing static electronic document from said plurality of information sources; and
update said at least one overlay and said at least one service associated with said at least one layer in response to said monitoring.

14. The system of claim 8, wherein said information source is integrated into an enhanced learning system as part of a distance learning course including an online component.

15. A computer program product comprising computer executable program code recorded on a computer readable non-transitory storage medium, said computer executable program code when executed, causing the actions including:
displaying an existing static electronic document downloaded from an existing eBook or other website on an electronic device, wherein said existing static electronic document comprises static content;
detecting, by the electronic device, a static text item selected in said existing static electronic document displayed on the electronic device;
sending, by the electronic device, a request for context-oriented content associated with the selected static text item to a server;
receiving, by the server, the request comprising the selected static text item from said electronic device;
receiving, by the server, information from at least one information source from the plurality of information sources;
extracting a context of said at least one information source and a context in which the selected static text item is described, wherein extracting the context in which the selected static text item is described in the existing static electronic document comprises:
detecting a current page of the existing static electronic document displayed on the electronic device,
receiving main topic and sub-topic described in the current page of the existing static electronic document displayed on the electronic device, and
extracting the context in which the selected static text item is described in the existing static electronic document based on the main topic and the sub-topic described in the current page of the existing static electronic document displayed on the electronic device;
identifying a context-oriented content from said information received from said at least one information source based on said context of said at least one information source and said context in which the selected static text item is described in the existing static electronic document, wherein said identified context-oriented content provides enhanced content over said selected static text item of said existing static electronic document;
generating at least one overlay including said identified context-oriented content providing enhanced content over said selected static text item, wherein said overlay comprises at least one layer configured to provide at least one service corresponding to said identified context-oriented content; and
presenting said at least one overlay corresponding to said selected static text item with said enhanced content overlaying said existing static electronic document, wherein said overlay comprises a substantially transparent background.

16. The computer program product of claim 15, wherein said request comprises at least one of content associated with said selected static text item, and context information of said existing static electronic document, wherein said existing static electronic document is one of an electronic book, and electronic slides viewed through a document viewer application.

17. The computer program product of claim 15, wherein said computer executable program code when executed, causing further actions comprises:
receiving an information source, corresponding to the identified context-oriented content, selected from said overlay; and
presenting said identified context-oriented content from said selected information source using said at least one service within said at least one layer of said overlay, wherein said at least one service of said at least one layer is selectively controlled.

18. The computer program product of claim 15, wherein said method further comprises storing said at least one overlay in a memory on said electronic device, wherein said identified context-oriented content in said at least one overlay is stored in a structured way, wherein said at least one overlay comprises a link linking said identified context-oriented content received from the said at least one information source presented to said user for said selected static text item.

19. The computer program product of claim 15, wherein said method further comprises storing said at least one overlay in at least one server accessible by said electronic device, wherein said identified context-oriented content in said at least one overlay is stored in a structured way.

20. The computer program product of claim 15, wherein said computer executable program code when executed, causing further actions comprises:
frequently monitoring said at least one of content and context associated with said selected static text item of said existing static electronic document from said plurality of information sources; and
updating said at least one overlay and said at least one service associated with said at least one layer in response to said monitoring.

21. The computer program product of claim 15, wherein said information source is integrated into an enhanced learning system as part of a distance learning course including an online component.

* * * * *